United States Patent Office 3,549,272
Patented Dec. 22, 1970

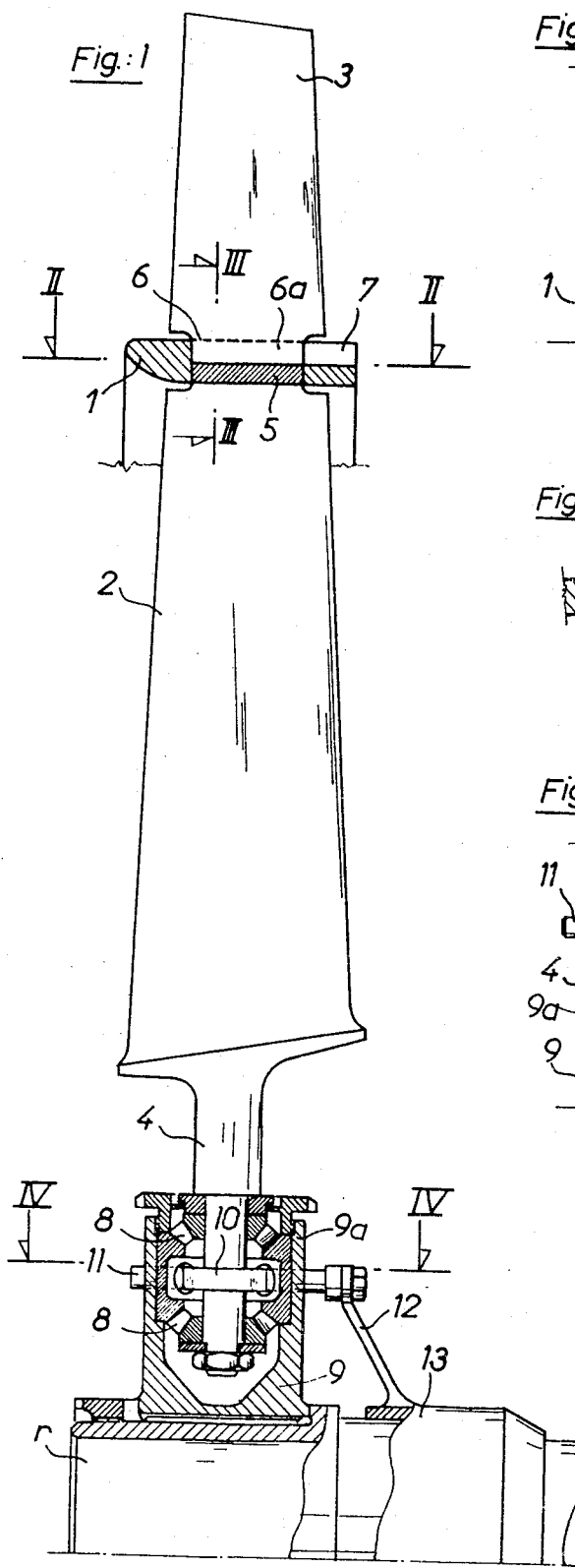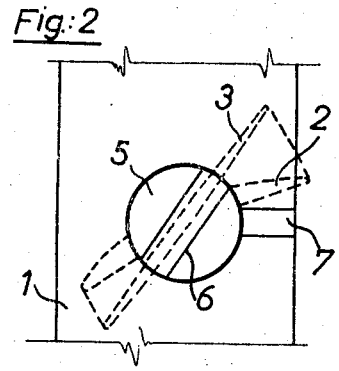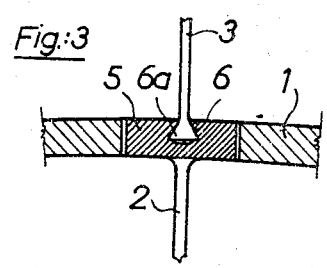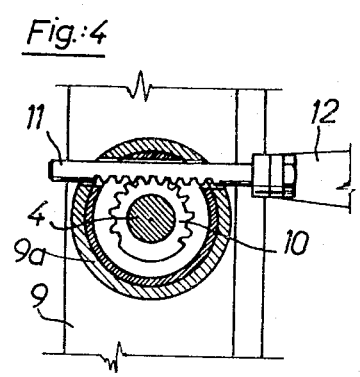

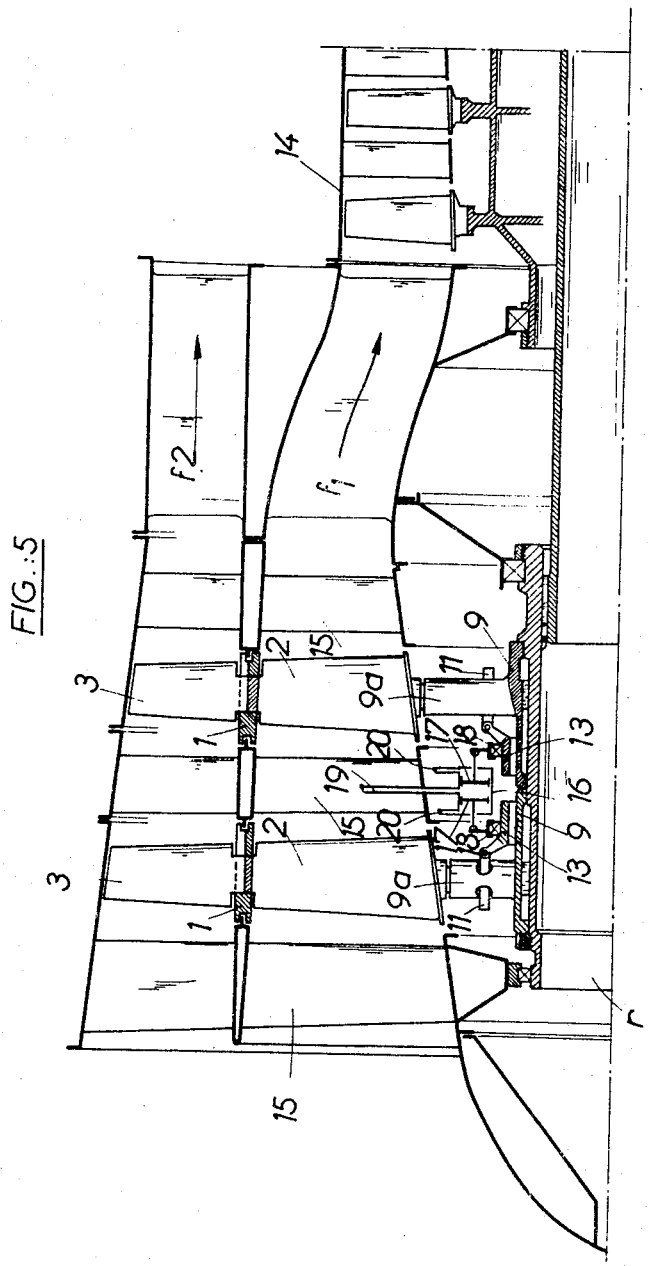

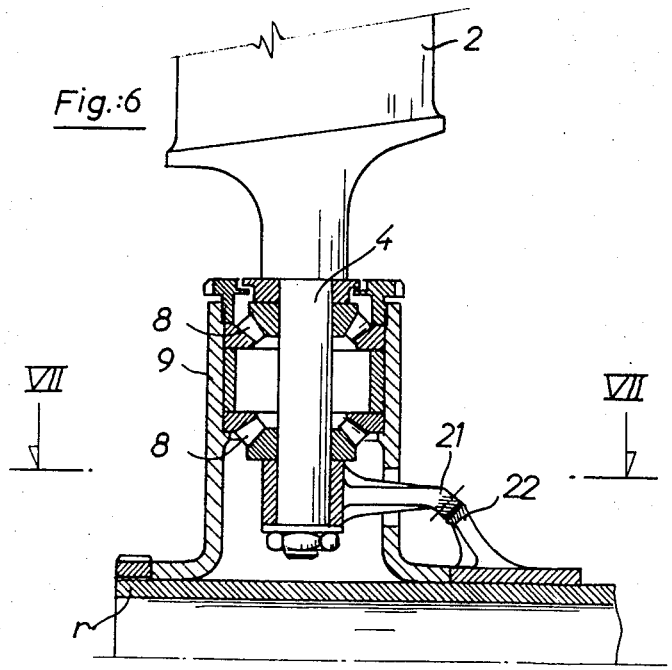
Fig.:6
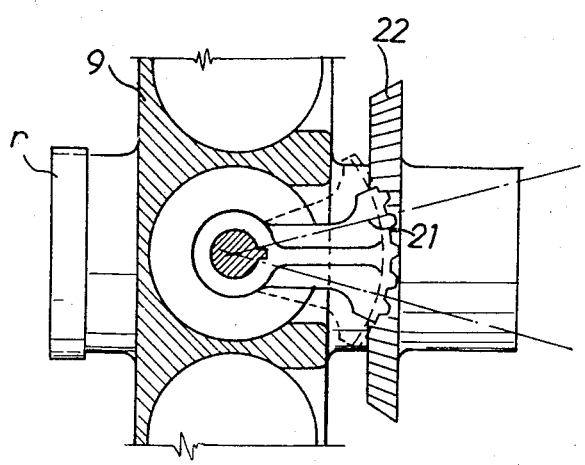
Fig.:7

3,549,272
IMPROVEMENTS IN OR RELATING TO BLADING ARRANGEMENT FOR TURBOMACHINES
Louis Jules Bauger, Vanves, Jean Georges Bouiller, Brunoy, and Armand Jean-Baptiste Lacroix, Itteville, France, assignors to Societe Nationale d'Etude et de Construction de Moteurs d'Aviation, Paris, France, a company of France
Filed Dec. 10, 1968, Ser. No. 782,614
Claims priority, application France, Dec. 12, 1967, 131,915
Int. Cl. F01d 5/22
U.S. Cl. 416—166      3 Claims

ABSTRACT OF THE DISCLOSURE

A blade ring, in particular for dual-flow turbomachines, in which each of the blades of the ring is made up of two sections connected with one another and arranged in radial extension of one another, said sections cooperating, in the zone at which they are joined to one another, with an annular partitioning and stiffening element disposed coaxially with the machine axis.

---

This invention relates to a blading arrangement, more particularly to a blading arrangement for a dual coaxial flow turbomachine.

Such a blading arrangement is adapted to cooperate with two coaxial flows of different nature, for example a flow of air which is to be compressed and a flow of expanding combustion gases, or of the same nature, for example two air flows, as in the case with a blading fitted to a low-pressure compressor or fan in certain gas turbine jet propulsion engines of the bypass type; in this particular application, the invention makes it possible to achieve a particularly effective combustion.

According to the invention, there is provided a blading arrangement comprising in a dual coaxial flow turbomachine, a blade ring of the type having composite blades each in the form of two structurally independent blade sections arranged one as an extension of the other in a substantially radial direction and for cooperating respectively with one and the other of the two flows, one of said blade sections having a root portion containing a profiled groove in which engages a correspondingly profiled head on the other blade section, said blade ring being characterized by the improvement comprising an annular stiffening element interconnecting the blades of the ring at the adjacent root and head portions of the respective sections of each blade, said annular element containing a plurality of peripherally spaced substantially radial passages adapted to receive the said root portions.

The annular element acts as a partition between the blades sections and helps to render the blade row more rigid and to prevent blade vibration.

It also enables the two coaxial flows, with which the two sections of each blade respectively cooperate, to be separated from one another, and it will be appreciated that the blade sections need not necessarily have the same angular pitch.

In accordance with a feature of the invention, the flanged portion-receiving passage in the annular stiffening element is of circular cross-section so that each blade can pivot as a whole about an axis substantially perpendicular to the axis of the machine.

In accordance with another feature of the invention, the annular element is formed with grooves in extension of the grooves in the flanged portions, in order to facilitate assembly of the blade sections.

In accordance with still another feature of the invention, the blade as a whole is attached by a pivot to a part of the machine carrying it, and a device acting on the respective pivots of the various blades in the row makes it possible simultaneously to modify the angular pitch of the blades.

Advantageously, the variation of the angular offset of the blades in two successive rings can be produced by a common control device lodged in the space formed between the two rings.

The ensuing description relating to the accompanying drawing will indicate by way of a non-limitative example how the invention may be put into effect.

In the drawings:

FIG. 1 is an elevational view of one of the blades of a blade row in accordance with one embodiment of the invention; it also illustrates in section an annular element linking together the blades of the row, and a device which controls the angular pitch of these blades;

FIGS. 2, 3 and 4 are partial sections on the lines II—II, III—III and IV—IV of FIG. 1;

FIG. 5 is a schematic axial section through the low-pressure compressor of a dual-flow gas turbine jet propulsion engine having two blade rows in accordance with the embodiment of FIG. 1;

FIG. 6 is a variant embodiment of the device employed to control the angular offset of the blades; and FIG. 7 is a section of the line VII—VII of FIG. 6.

FIG. 1 illustrates a blade belonging to a row of rotor blades of a low-pressure compressor as used in a dual-flow gas turbine jet propulsion engine. This blade is connected to the compressor shaft $r$ and driven by same so that it rotates in a plane perpendicular to the plane of the figure. An annular element 1 divides said blade into two sections, viz, a radially inner section 2 and a radially outer section 3, arranged in mutual radial extension to one another.

The inner section 2 of the blade terminates at its tip in a flanged portion 5, engaging in a corresponding radial passage in the element 1. A groove 6, machined in the flanged portion 5 and having a conventional kind of blade-fixing profile (dovetail, Christmas tree, etc.) makes it possible to attach to the said flanged portion the outer section 3 the base of which has a profiled tongue portion 6a (FIG. 3) which mates with the groove profile. In order to enable this tongue portion 6a to slide in the groove 6 in the flange, a groove 7 of the same profile as the groove 6 is machined in the thickness of the element 1, and can subsequently be closed off using some appropriate means.

This kind of arrangement makes it possible, as those skilled in the art will appreciate, to produce composite blades 2, 3 of substantial radial length, in a manner which is desirable in the case of low-pressure compressors or fans for dual-flow gas turbine jet propulsion engines, and, due to the provision of the annular element 1, there is effective stiffening of the blades and damping of any tendency they may have to vibrate. It will also be observed that where the outer section 3 is concerned it is possible to give it a profile which is suitable to its particular function, there being no longer any necessity to be restricted to the same profile as that of the inner blade section 2.

In the drawing, a particularly interesting embodiment of the invention has been illustrated, where each one of the blades can be pivoted as a whole about its own axis, in order to modify its angular pitch during operation of the machine.

The inner section 2 of each of the blades terminates in a pivot 4 which is secured in taper-roller bearings 8 in a mounting location 9a formed in an annular member 9 fixed to the shaft $r$ of the compressor. The taper-roller bearings 8 locate and centre the blades, withstanding the centrifugal loadings and enabling the blades to pivot.

Each pivot 4 comprises a gear 10 in mesh with a toothed rack 11, the latter parallel to the axis of the machine and carried by an arm 12, the various arms 12 being secured to a sleeve 13 assembled to slide on the shaft $r$. The flanged portion 5 and the corresponding passage in the element 1, are circular in section, as FIG. 2 shows, the groove 6 in the flanged portion being machined along a diameter or chord of the circle.

It will be seen that a device of this kind makes it possible, by sliding the sleeve 13 which is itself controlled by a hydraulic jack (not shown) or some other appropriate device, to pivot all the blades of the row about their respective axes, thus varying the angular pitch of the blades in accordance with requirements.

At the time of assembly of the outer section 3 on the inner section 2, the latter already having its flanged portion 5 engaged in the annular element 1, the inner section will of course have an angular pitch such that the groove 6 in its flanged portion 5 is aligned with the corresponding groove 7 in the element 1 so that the tongue 6a of the outer section 3, first of all offered into the groove 7, can then be pushed through into the groove 6. In this context, use is made of the facility for pivoting the inner sections 2. After this assembly operation, the blades are returned to their normal pitch angle of offset (FIG. 2) and, since the grooves 6 and 7 are no longer in line, the outer sections 3 cannot escape. As already mentioned, the grooves 7 can be closed off after assembly using riveted keepers or the like.

FIG. 5 illustrates a low-pressure multistage compressor for a dual-flow gas turbine jet propulsion engine. The two coaxial flows are marked respectively by the arrow $f_1$ in the case of the primary flow (which is subsequently fed to a high-pressure compressor 14), and $f_2$ in the case of the secondary flow.

In the example illustrated, the low-pressure compressor has two rotor stages or rows equipped with composite blades 2, 3 of the kind already described in relation to the earlier figures, although it may of course have more than just two. The general reference 15 indicates the fixed or stator blade rows of the low-pressure compressor. These fixed blades may be of one-piece design or may consist of two assembled sections, possibly similar to those of the moving blades. They can have fixed angular pitch or a facility for varying this factor, with control exercised at the periphery using known arrangements which have not been illustrated.

In this figure, the racks 11 which enable the pitch angle of the rotor blades to be varied, can be seen. As explained hereinbefore, these racks 11 are fixed to sleeves 13 which can slide axially on the shaft $r$, one such sleeve being provided in respect of each rotor stage. The sleeves 13 are controlled in pairs by at least one fixed jack 16 located in the annular space surrounding the shaft $r$ and between two rotor stages. This jack is essentially in the form of a cylinder with three chambers in which two pistons 17 slide symmetrically through similar and opposite longitudinal travels, imparting these movements to the two sleeves 13.

Because these two sleeves are moved in mutually opposite directions, as the figure indicates the racks associated with one of the rotor stages are located, in relation to the axes of pivot of the blades, at the opposite side to that at which the racks associaed with the other rotor stage are located, this so that the variation in pitch angle of the blades of two successive rotor stages takes place in the same direction.

The fixed double jack 16 can be mounted on non-rotating rings carried by the two rotating sleeves 13, through the medium of roller thrust bearings 18.

The supply of oil to the jack is effected through piping arrangements 19, 20 which pass inside one of the blades of the stator row arranged between the two rotor stages. The piping arrangements 19, 20 pass through the machine housing and are connected to a control valve (not shown) which controls the oil pressure in order to set the optimum angular pitch to accord with the particular conditions of operation.

Self-evidently, the control of a larger number of rotor stages can be effected in the same way, two by two.

The control of the angular pitch of the blades could equally well be effected by other means, for example pneumatic, mechanical or possibly electrical means, the advantage of an electrical control arrangement being that it can be taken through the centre of the machine thus avoiding any exits across the stator blades and housing, to the outside.

FIGS. 6 and 7 illustrate a variant embodiment of the device for controlling the angular pitch of the blades, in accordance with which each pivot 4 carries a toothed sector 21 projecting outside the annular member 9. The various sectors 21 are all in mesh with a toothed ring 22 centered on the shaft $r$. This toothed ring 22 rotates at the same speed as the shaft $r$ but, using a control device which has not been shown, can be imparted a rotational movement relative to said shaft. In this case, through the medium of the toothed sectors 21 it produces a variation in the angular pitch of the blades.

It will be apparent that the embodiments described herein have been given purely by way of example and are open to modification in various ways within the scope of the present invention, as defined by the appended claims.

We claim:
1. In a dual coaxial flow turbomachine, a blading arrangement comprising:
   a row of circumferentially-spaced two-tier blades each in the form of two structurally independent blade sections (2), (3) arranged in radial extension of one another and cooperating respectively with one and the other of the two flows, one of said blade sections (2) having at one of its radial ends a flanged portion (5) formed with a profiled groove (6) which receives a similarly profiled tongue portion (6a) formed on the other blade section (3); and
   an annular stiffening element (1) interconnecting the blades of the row at the adjacent flanged and tongue portions (5), (6a), of the respective sections of each blade, said annular element being formed with a plurality of circumferentially-spaced passages (1a) extending substantially radially therethrough and receiving the said flanged portions, said annular element being further formed with a plurality of grooves (7) each of which opens into a respective passage (1a) and constitutes a continuation of the profiled groove (6) formed in said flanged portion (5).

2. A blading arrangement according to claim 1, wherein each said flanged portion is received in its respective passage with freedom for pivotal movement about the respective blade axis, said arrangement further comprising means (10) mounting each blade on the turbomachine for pivotal movement about said blade axis and common control means for effecting simultaneous pivotal movement of all the blades of the row to vary the angular pitch of said blades.

3. A blading arrangement according to claim 1, wherein the two sections of each blade have differing angular pitches.

References Cited
UNITED STATES PATENTS

| | | | |
|---|---|---|---|
| 2,306,096 | 12/1942 | Vose | 170—166X |
| 2,670,050 | 2/1954 | Enos | 170—167X |
| 3,467,198 | 9/1969 | Ellinger | 170—166X |
| 3,468,473 | 9/1969 | Davies et al. | 60—262X |

EVERETTE A. POWELL, JR., Primary Examiner

U.S. Cl. X.R.

416—193, 203, 210